Figure 1:
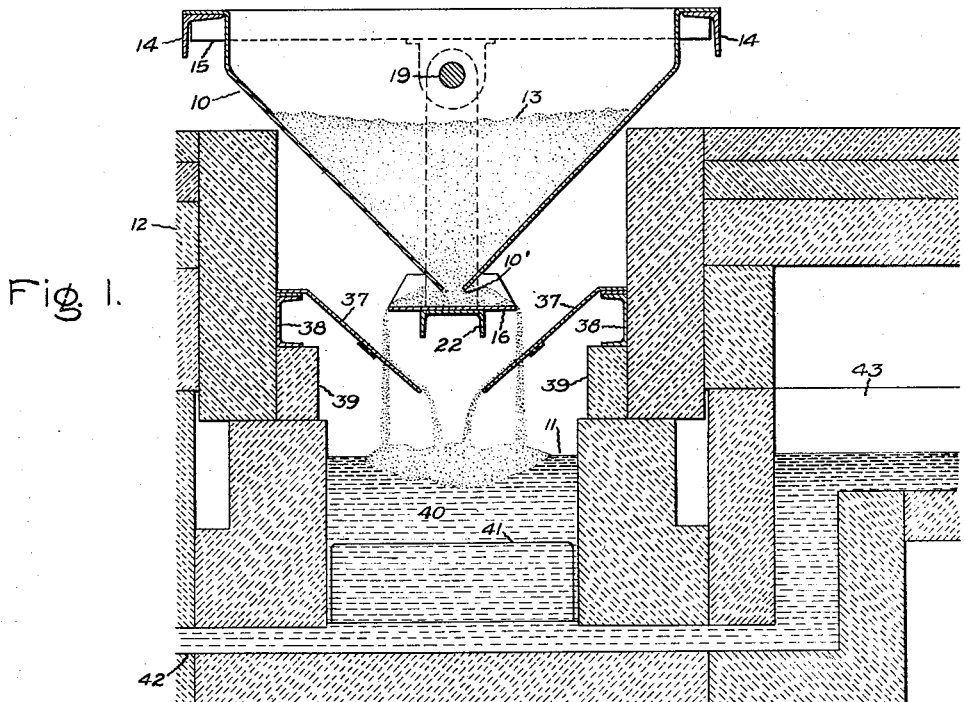

Oct. 31, 1939.   C. A. BROWN ET AL   2,178,418
GLASS BATCH FEEDER
Filed July 28, 1937

Inventors:
Carl A. Brown,
Charles W. Craig,
by Harry E. Dunham
Their Attorney

Patented Oct. 31, 1939

2,178,418

UNITED STATES PATENT OFFICE 2,178,418

GLASS BATCH FEEDER

Carl A. Brown, Chardon, and Charles W. Craig, Cleveland Heights, Ohio, assignors to General Electric Company, a corporation of New York Application July 28, 1937, Serial No. 156,126

5 Claims. (Cl. 49—54)

Our invention relates to glass melting furnaces generally and more particularly to apparatus for feeding glass batch material thereto.

In order to maintain a uniform temperature in glass furnaces and preserve the heat balance thereof, the batch material must be introduced into the furnace gradually and must be evenly distributed therein. These precautions are particularly desirable when the furnace is electrically heated by the passage of current through the bath of molten glass since the batch material, when introduced, is a good insulator and only becomes conductive upon being heated and even then varies considerably in resistance with changes in temperature.

One of the objects of our invention is to provide apparatus for satisfactorily feeding batch material to a glass furnace. Another object is to provide apparatus for feeding the batch material gradually and for distributing it evenly over a large area in the melting tank. Still another object is to provide apparatus for satisfactorily feeding batch material which is granular and of uneven consistency. Further objects and advantages of our invention will appear from the following description of a species thereof and from the drawing.

Figure 2:
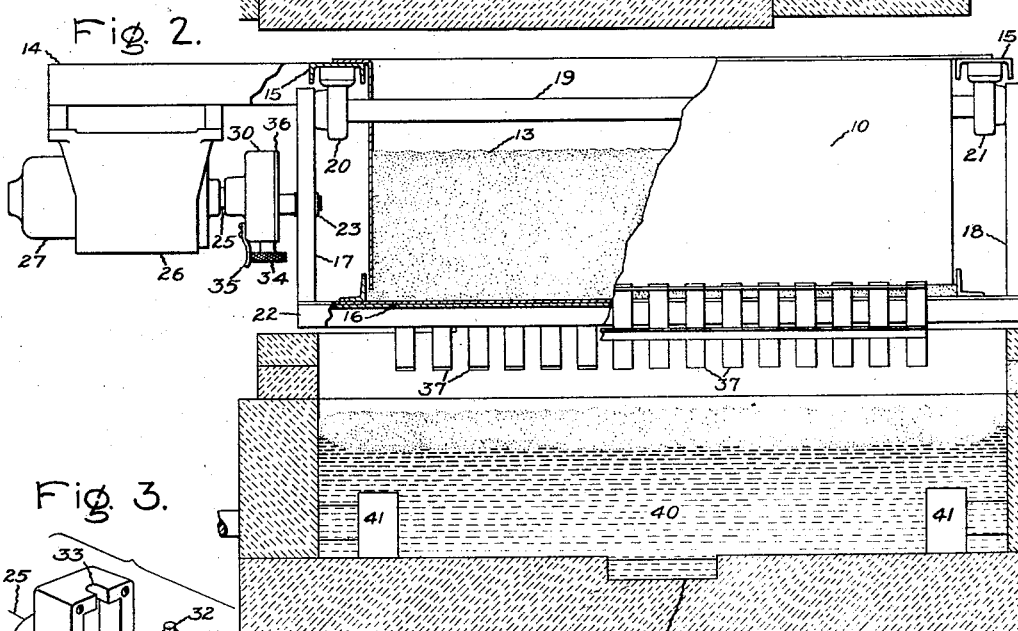
Figure 3:
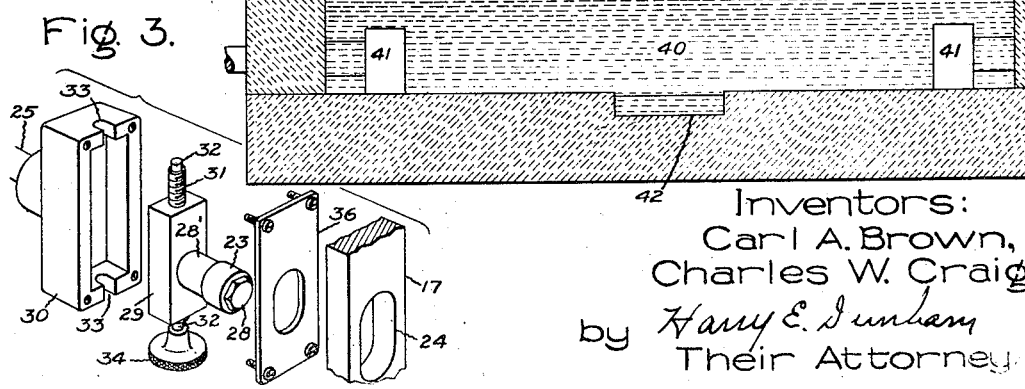

In the drawing, Fig. 1 is a vertical transverse section through a glass batch feeding apparatus comprising our invention and a portion of an electrical glass furnace; Fig. 2 is a side elevation of said apparatus with a portion broken away and a longitudinal section through said glass furnace; and Fig. 3 is an exploded perspective view of a portion of the actuating means for the feeder.

Referring to Figs. 1 and 2, the batch feeder comprises a hopper 10 which is mounted above the open melting tank 11 of the glass furnace 12 and is adapted to hold a sufficient quantity of the glass batch 13 to meet the requirements of the furnace for a relatively long period. The hopper 10 extends substantially the full length of the tank 11 and is held in position thereabove by angular bars 14 on opposite sides and channel bars 15 on opposite ends which are supported by means not shown. The sides of the hopper 10 are inclined toward an opening 10' in the center which extends the full length of the hopper and allows the batch material 13 to pass to the plate 16 located therebelow. The batch material 13 is quite granular and of uneven consistency so that it piles up on the plate 16 and prevents additional batch material from passing from the hopper 10. The plate 16 is fastened to the lower ends of arms 17 and 18 which are attached at their upper ends to a rod 19 which in turn is supported in bearings 20—21 attached to the bars 15. The plate 16 is stiffened by a metal channel 22 attached to the bottom thereof.

The actual feeding operation occurs when the plate 16 is swung back and forth across the opening 10' in the hopper 10 which results in the batch material 13 being partially dumped and partially shaken from said plate 16. The extent and rate of the oscillation of the plate 16 control the amount of batch material 13 fed. As some of the batch material 13 falls from the plate 16, additional batch material passes from the hopper 10 to the plate 16 to replace that shaken therefrom. The plate 16 is caused to oscillate by a roller 23 which is located in the slot 24 (Fig. 3) in the arm 17 and is mounted eccentrically on the end of the shaft 25 of a speed reducer 26 which is driven by an electric motor 27. The eccentricity of the mounting for the roller 23 controls the amount of movement of the plate 16 since there is no sideward free motion of said roller 23 in the slot 24. The eccentricity may be varied to alter the extent of oscillation of the plate 16 and thereby vary the amount of batch material fed. The roller 23 is mounted through the stud 28 on the boss 28' extending from the slide 29 and is adjusted with respect to the axis of the shaft 25 by movement of said slide 29 in the ways in block 30 in which it is mounted. The slide 29 is adjusted and retained in the desired position within the ways of block 30 by a screw 31 which is threaded through a hole in said slide and is held in place in the block 30 by the reduced end portions 32 which fit into slots 33 in the block 30. Manual adjustment of the slide 29 is made through a knob 34 on one end of the screw 31 which is prevented from turning during operation of the apparatus by the frictional engagement of a spring finger 35 (Fig. 2) therewith. The cover plate 36 holds the slide 29 and the screw 31 in place in the openings in the block 30.

The oscillation of the plate 16 from side to side causes the batch material 13 to be gradually sprinkled onto the inclined stationary fingers 37 at both sides of the apparatus which break up the flow of the material 13 even more, so that it is quite evenly distributed over the surface of the partially melted batch in the furnace tank 11. The fingers 37 are mounted on metal channels 38 located on the furnace blocks 39. In this instance the furnace 12 is heated by the passage of electric current through the molten glass 40 located between the electrodes 41—41, and the semi-molten glass batch 18 floating on top of the molten glass shields and insulates the feeding apparatus from the heat of the molten glass. The molten glass flows through openings 42 in both sides of the furnace 12 to the forehearths 33 at each side and replaces that used therefrom.

What we claim as new and desire to secure by Letters Patent of the United States is:

1. Apparatus for making glass comprising in combination a melting tank, and means for feeding batch material to said tank comprising a hopper located over said tank and having an opening at the bottom thereof, a plate mounted below said opening in said hopper adapted to receive and hold a sufficient quantity of batch material to block the flow of material from said hopper, means for oscillating said plate across the opening in said hopper to shake batch material therefrom into said tank and cause additional batch material to flow to said plate from the hopper, and a plurality of spaced inclined fingers located below said plate to intercept and deflect some of the batch material falling from said plate to distribute it more evenly in the tank.

2. Apparatus for making glass comprising in combination a melting tank, and means for feeding batch material to said tank comprising a hopper located over said tank and extending along substantially the full length of said tank and having an opening extending the length of the bottom thereof, a plate mounted below and coextensive with said opening in said hopper so arranged as to receive and hold a sufficient quantity of batch material to block the flow by gravity of material from said hopper and means for oscillating said plate laterally across the opening in said hopper to shake batch material therefrom directly into said tank and cause additional batch material to flow to said plate from the hopper.

3. Apparatus for making glass comprising in combination a melting tank, and means for feeding batch material to said tank comprising a hopper located over said tank and extending along substantially the full length of said tank and having an opening extending the length of the bottom thereof, a plate mounted below and coextensive with said opening in said hopper adapted to receive and hold a sufficient quantity of batch material to block the flow of material from said hopper, means for oscillating said plate across the opening in said hopper to shake batch material therefrom into said tank and cause additional batch material to flow to said plate from the hopper, and a pair of rows of transverse spaced inclined fingers located below and extending the length of said plate to intercept and deflect some of the batch material falling from said plate to distribute it more evenly in the tank.

4. Apparatus for making glass comprising in combination a melting tank, and means for feeding batch material to said tank comprising a hopper located over said tank and extending along substantially the full length of said tank and having an opening extending the length of the bottom thereof, a plate mounted below and coextensive with said opening in said hopper so arranged as to receive and hold a sufficient quantity of batch material to block the flow by gravity of material from said hopper, an arm extending upwardly from said plate and pivotally mounted at its upper end, and means for swinging said arm about its pivot for oscillating said plate laterally across the opening in said hopper to shake batch material therefrom directly into said tank and cause additional batch material to flow to said plate from the hopper.

5. Apparatus for making glass comprising in combination a melting tank, and means for feeding batch material to said tank comprising a hopper located over said tank and having an opening at the bottom thereof, a plate mounted below said opening in said hopper adapted to receive and hold a sufficient quantity of batch material to block the flow of material from said hopper, an arm extending upwardly from said plate and pivotally mounted at its upper end, a driven shaft mounted adjacent to the side of said arm, and a roller eccentrically mounted on said shaft and engaging a slot in said arm to swing said arm about its pivot for oscillating said plate across the opening in said hopper to shake batch material therefrom into said tank and cause additional batch material to flow to said plate from the hopper.

CARL A. BROWN.
CHARLES W. CRAIG.